(12) United States Patent
DiFoggio (10) Patent No.: US 7,027,928 B2
(45) Date of Patent: Apr. 11, 2006

(54) SYSTEM AND METHOD FOR DETERMINING FORMATION FLUID PARAMETERS

(75) Inventor: Rocco DiFoggio, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 61 days.

(21) Appl. No.: 10/838,103

(22) Filed: May 3, 2004

(65) Prior Publication Data

US 2005/0246151 A1 Nov. 3, 2005

(51) Int. Cl.
*G01V 9/00* (2006.01)
*G01V 11/00* (2006.01)
*E21B 47/06* (2006.01)

(52) U.S. Cl. ...................................................... 702/13

(58) Field of Classification Search ................ 702/7, 702/12, 13; 175/65, 72, 40; 73/152.18, 73/152.19, 152.05, 152.29, 152.31, 152.04
See application file for complete search history.

(56) References Cited

U.S. PATENT DOCUMENTS

| | | | |
|---|---|---|---|
| 3,913,398 A * | 10/1975 | Curtis ...................... 73/152.33 |
| 4,524,274 A * | 6/1985 | Scott ........................ 250/269.4 |
| 5,377,755 A | 1/1995 | Michaels et al. |
| 5,708,204 A | 1/1998 | Kasap |
| 5,803,186 A | 9/1998 | Berger et al. |
| 6,003,620 A * | 12/1999 | Sharma et al. ................ 175/50 |
| 6,176,323 B1 * | 1/2001 | Weirich et al. ............... 175/40 |
| 6,568,487 B1 | 5/2003 | Meister et al. |
| 6,585,045 B1 | 7/2003 | Lee et al. |
| 6,609,067 B1 * | 8/2003 | Tare et al. ...................... 702/9 |
| 6,688,176 B1 * | 2/2004 | Storm et al. ................... 73/579 |
| 6,912,904 B1 * | 7/2005 | Storm et al. ................... 73/579 |
| 2002/0010548 A1 | 1/2002 | Tare et al. |
| 2003/0212495 A1 | 11/2003 | Mese et al. |
| 2004/0220742 A1 | 11/2004 | Mese et al. |

* cited by examiner

*Primary Examiner*—Donald McElheny, Jr.
(74) *Attorney, Agent, or Firm*—Madan, Mossman & Sriram, P.C.

(57) ABSTRACT

A method for determining a parameter of interest of a formation fluid, comprises moving a tool attached to a tubular member along a borehole in a subterranean formation. The tool is used to determine a formation fluid pressure and a formation fluid temperature at predetermined locations along the borehole and calculating a formation fluid density along the borehole therefrom. A density of a reference fluid is determined along the borehole and is related to the formation fluid pressure and the formation fluid temperature. The parameter of interest of the formation fluid is determined at a predetermined location from a comparison of the corresponding formation fluid density and the reference fluid density at the predetermined location.

25 Claims, 5 Drawing Sheets

SYSTEM AND METHOD FOR DETERMINING FORMATION FLUID PARAMETERS

BACKGROUND OF THE INVENTION

1. Field of the Invention

This invention relates to the testing of underground formations or reservoirs. More particularly, this invention relates to an apparatus and a method for determining properties of formation fluids by interpreting formation fluid pressure and temperature measurements.

2. Description of the Related Art

When a wellbore is drilled, fluids from the drilling process, called filtrate, may be forced into the pore spaces of some of the earth formations, changing their fluid content and therefore their fluid properties. The process of the filtrate being forced into the pore spaces is generally referred to as "invasion". The formation fluids may be hydrocarbon liquids and gases, and aqueous liquids, including brine. Well logging operations, either by wireline or while drilling, are used to determine properties of the formation fluids, in order to determine the potential hydrocarbon content and the locations of formation water and gas interfaces. Many of the logging systems detect the formation properties relatively close to the borehole such that the invaded zone affects the measurements. For example, when interpreting deep-reading electric well logs, it is important to know the true formation brine resistivity, which is a function of the brine salinity. When drilling with fresh water based drilling mud, the filtrate in the invaded zone can alter the resistivity of the filtrate contaminated brine in the invaded zone and substantially bias the resistivity reading. In addition, some of the highly saline brines encountered have resistivity readings that are beyond the range of presently available sensors.

Likewise, when attempting to determine gas properties in a reservoir, the filtrate in the invasion zone, affects the readings of the gas property measurements. The filtrate may also plug and contaminate sensors designed for such gas measurements. For example, it is known in the art to take a sample of the gas using a tool such as a formation tester and to pass the gas by a sensor in a flow passage in the tool for analysis. The presence of the filtrate from the invasion zone may clog such a device and/or bias the readings of such an analytical device.

A formation pressure test may be taken at multiple locations along the borehole as a formation test tool is conveyed by wireline, or in a drill string, downward through a borehole. The difference between formation pressures at two locations divided by the vertical distance between the locations produces the average pressure gradient over the interval between the test locations. The pressure gradient may be used to determine fluid density in-situ and the interface or contact points between gas, oil and water when these fluids are present in a single reservoir.

Thus there is a demonstrated need for a system and method for determining formation fluid properties that are not substantially biased by the presence of a filtrate invasion zone proximate the borehole.

SUMMARY OF THE INVENTION

In one aspect of the present invention, a method for determining a parameter of interest of a formation fluid comprises moving a tool attached to a tubular member along a borehole in a subterranean formation. The tool is used to determine a formation fluid pressure and a formation fluid temperature at predetermined locations along the borehole and calculating a formation fluid density along the borehole therefrom. A density of a reference fluid is determined along the borehole and is related to the formation fluid pressure and the formation fluid temperature. The parameter of interest of the formation fluid is determined at a predetermined location from a comparison of the corresponding formation fluid density and the reference fluid density at the predetermined location.

In another aspect, a system for determining a formation fluid parameter of interest comprises a tool attached to a tubular member in a borehole, where the tool is adapted to determine a formation fluid pressure and a formation fluid temperature along the borehole. A controller acting under programmed instructions determines a formation fluid density along the borehole from the formation fluid pressure. A model of a reference fluid is stored in the controller for determining a reference fluid density at a predetermined location in the borehole. An empirical correlation is stored in the controller, where the correlation relates the formation parameter of interest to a comparison of the formation fluid density to the reference fluid density.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein.

DETAILED DESCRIPTION

The system and methods of the present invention overcome the foregoing disadvantages of the prior art by determining formation fluid density from pressure gradient measurements and relating the formation fluid density to desired formation fluid parameters of interest. Many logging tools, for example, resistivity tools, commonly detect parameters of the formation fluid within a few meters of the borehole. The invasion zone may be a substantial portion of the detection region and thus bias the measurement so as to be of little value. Other logging tools, such as formation testers, detect the fluid pressure of the formation fluid at a predetermined location along the borehole. Whether using wireline or measurement while drilling (MWD) systems, the formation tester systems commonly measure pressure by drawing down the pressure of a portion of the formation adjacent the borehole to a point below the expected formation pressure at an established rate until the formation fluid entering the tool stabilizes the tool pressure. Then the pressure is allowed to rise and stabilize by stopping the drawdown. As one skilled in the art will appreciate, when the measurement stabilizes, the formation pressure determined in such a manner is indicative of the formation pressure extending tens to hundreds of meters surrounding the borehole. The size of the invasion zone in such a measurement is considered so small as to have a negligible effect on the formation pressure measurement. The formation pressure may be determined at predetermined locations along the wellbore. From this formation pressure data, a formation pressure gradient may be determined between two locations along the wellbore where the formation fluid pressure gradient is substantially unaffected by filtrate contamination. As one skilled in the art will appreciate, the pressure gradient is related to the fluid density between the measurement stations. Any formation tester system is deemed suitable for use with the present invention. Examples of such systems are described in U.S. Pat. Nos. 5,377,755 A, 5,708,204 A, 5,803,186 A, 6,568,487 B2, 6,585,045 B2, each of which is incorporated herein by reference.

Figure 1:
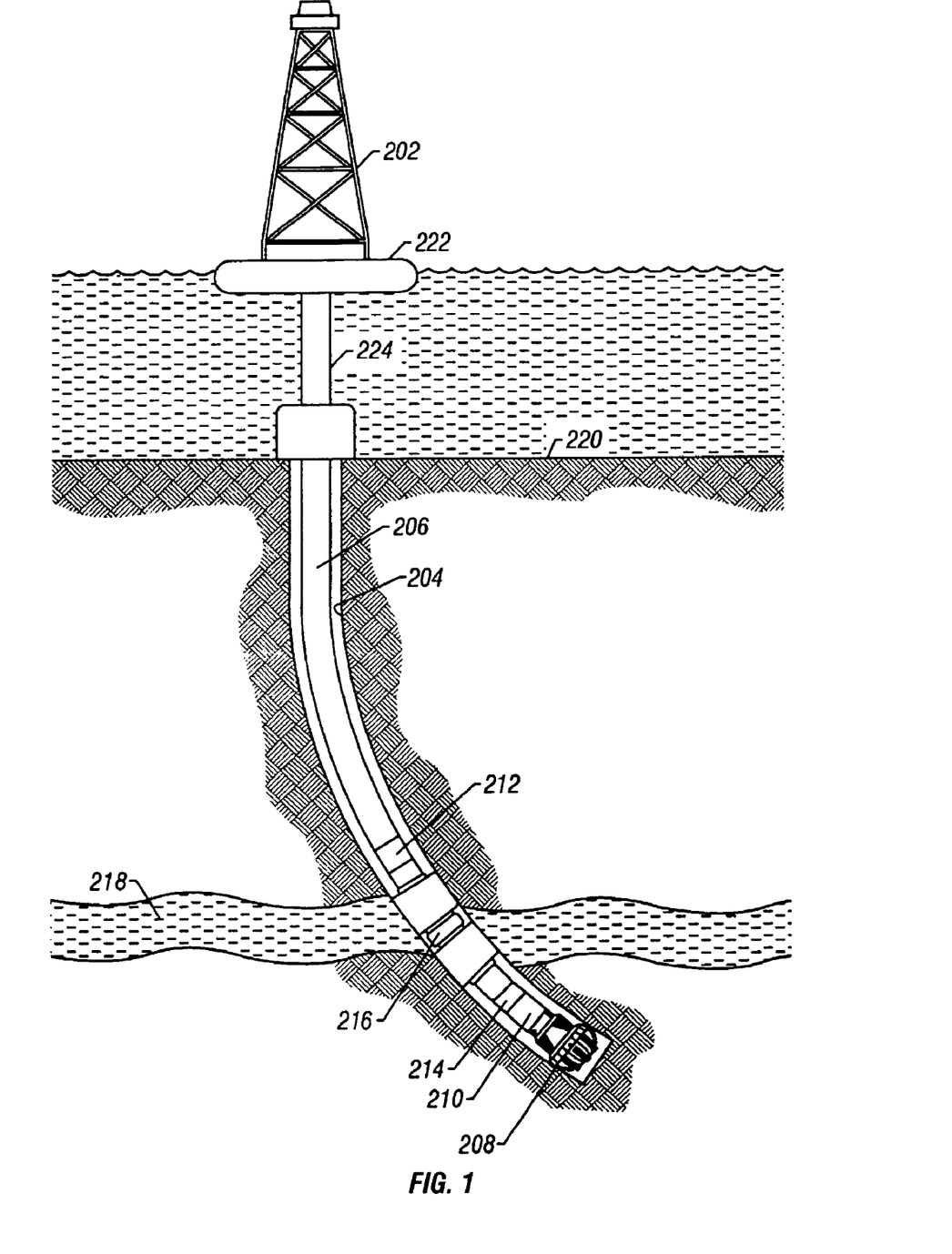
FIG. 1 is an elevation view of an offshore drilling system according to one embodiment of the present invention.

FIGS. 1–4 describe exemplary systems that may be used in the present invention. FIG. 1 is a drilling apparatus according to one embodiment of the present invention. A typical drilling rig 202 with a borehole 204 extending therefrom is illustrated, as is well understood by those of ordinary skill in the art. The drilling rig 202 has a work string 206, which in the embodiment shown is a drill string. The drill string 206 has attached thereto a drill bit 208 for drilling the borehole 204. The present invention is also useful in other types of work strings, and it is useful with a wireline, jointed tubing, coiled tubing, or other small diameter work string such as snubbing pipe. The drilling rig 202 is shown positioned on a drilling ship 222 with a riser 224 extending from the drilling ship 222 to the sea floor 220. However, any drilling rig configuration such as a land-based rig may be adapted to implement the present invention.

If applicable, the drill string 206 can have a downhole drill motor 210. Incorporated in the drill string 206 above the drill bit 208 is a typical testing unit, which can have at least one sensor 214 to sense downhole characteristics of the borehole, the bit, and the reservoir, with such sensors being well known in the art. A useful application of the sensor 214 is to determine direction, azimuth and orientation of the drill string 206 using an accelerometer or similar sensor. The BHA also contains the formation test apparatus 216 of the present invention, which will be described in greater detail hereinafter. A telemetry system 212 is located in a suitable location on the work string 206 such as above the test apparatus 216. The telemetry system 212 is used for command and data communication between the surface and the test apparatus 216.

Figure 2:
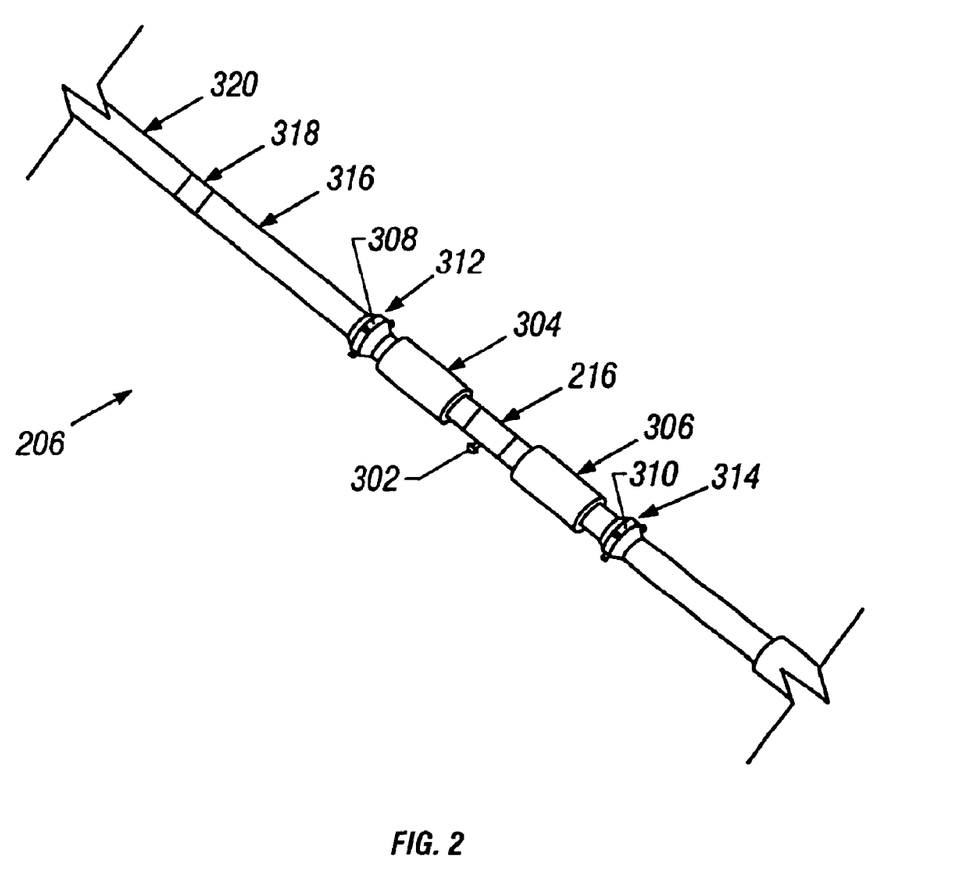
FIG. 2 shows a portion of drill string incorporating the present invention.

FIG. 2 is a section of drill string 206 incorporating the present invention. The tool section is commonly located in a BHA close to the drill bit (not shown). The tool includes a communication unit and power supply 320 for two-way communication to the surface and supplying power to the downhole components. In one embodiment, the tool requires a signal from the surface only for test initiation. A downhole controller and processor (not shown) carry out all subsequent control. The power supply may be a generator driven by a mud motor (not shown) or it may be any other suitable power source. Also included are multiple stabilizers 308 and 310 for stabilizing the tool section of the drill string 206 and packers 304 and 306 for sealing a portion of the annulus. A circulation valve disposed in the present example above the upper packer 304 is used to allow continued circulation of drilling mud above the packers 304 and 306 while rotation of the drill bit is stopped. A separate vent or equalization valve (not shown) is used to vent fluid from the test volume between the packers 304 and 306 to the upper annulus. This venting reduces the test volume pressure, which is required for a drawdown test. It is also contemplated that the pressure between the packers 304 and 306 could be reduced by drawing fluid into the system or venting fluid to the lower annulus, but in any case some method of increasing the volume of the intermediate annulus to decrease the pressure will be required.

In one embodiment of the present invention an extendable pad-sealing element 302 for engaging the well wall 3 is disposed between the packers 304 and 306 on the test apparatus 216. The pad-sealing element 302 could be used without the packers 304 and 306, because a sufficient seal with the well wall can be maintained with the pad 302 alone. If packers 304 and 306 are not used, a counterforce is required so pad 302 can maintain sealing engagement with the wall of the borehole 204. The seal creates a test volume at the pad seal and extending only within the tool to the pump rather than also using the volume between packer elements.

One way to ensure the seal is maintained is to ensure greater stability of the drill string 206. Selectively extendable gripper elements 312 and 314 could be incorporated into the drill string 206 to anchor the drill string 206 during the test. The grippers 312 and 314 are shown incorporated into the stabilizers 308 and 310 in this embodiment. The grippers 312 and 314, which would have a roughened end surface for engaging the well wall, would protect soft components such as the pad-sealing element 302 and packers 304 and 306 from damage due to tool movement. The grippers 312 would be especially desirable in offshore systems such as the one shown in FIG. 1, because movement caused by heave can cause premature wear out of sealing components.

Figure 3:
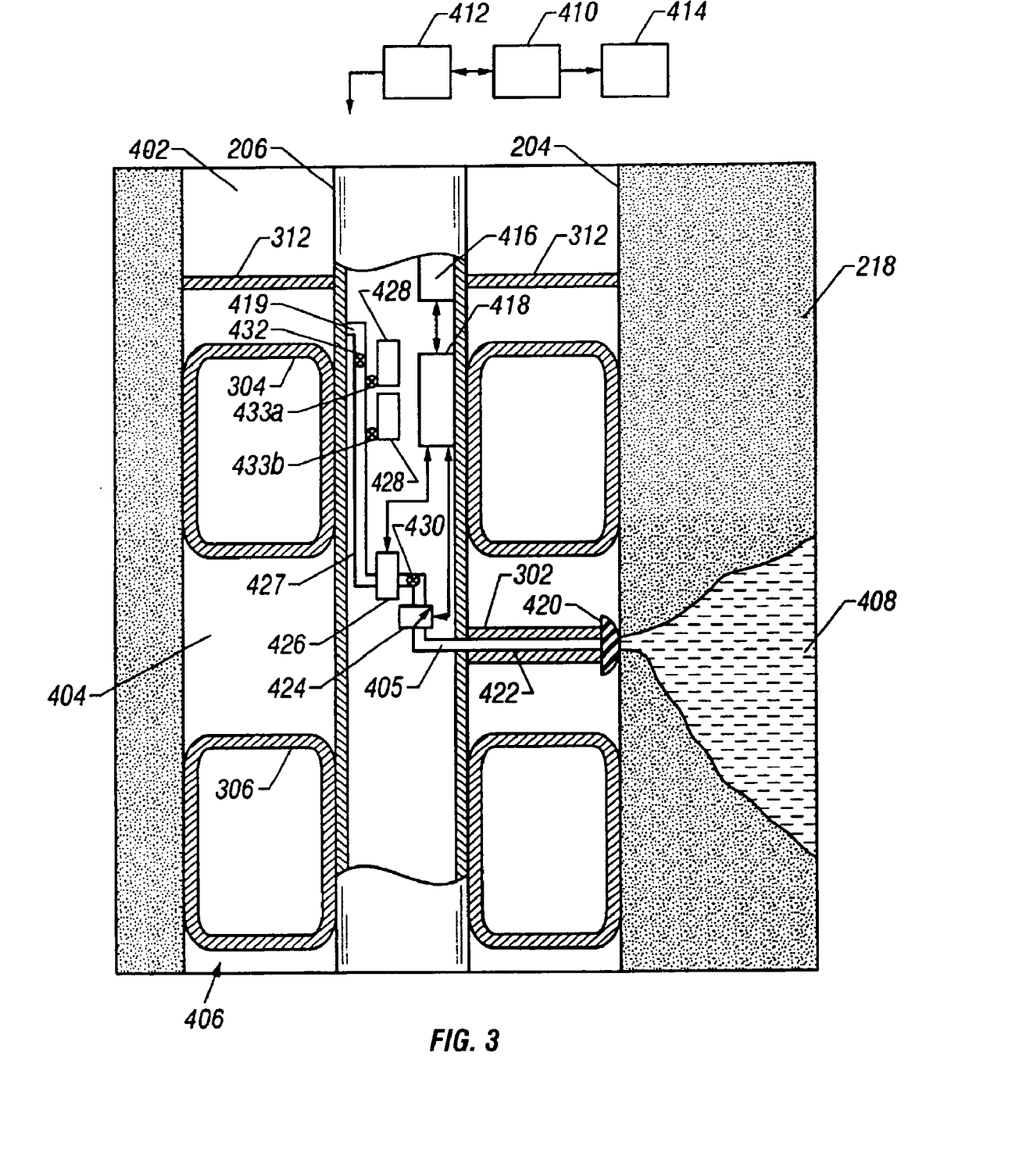
FIG. 3 is a system schematic of the present invention.

FIG. 3 shows the tool of FIG. 2 schematically with internal downhole and surface components. Selectively extendable gripper elements 312 engage the borehole wall 204 to anchor the drill string 206. Packer elements 304 and 306 well known in the art extend to engage the borehole wall 204. The extended packers separate the well annulus into three sections, an upper annulus 402, an intermediate annulus 404 and a lower annulus 406. The sealed annular section (or simply sealed section) 404 is adjacent a formation 218. Mounted on the drill string 206 and extendable into the sealed section 404 is the selectively extendable pad sealing element 302. A fluid line providing fluid communication between pristine formation fluid 408 and tool sensors such as pressure sensor 424 is shown extending through the pad member 302 to provide a port 420 in the sealed annulus 404. The preferable configuration to ensure pristine fluid is tested or sampled is to have packers 304 and 306 sealingly urged against the wall 204, and to have a sealed relationship between the wall and extendable element 302. Reducing the pressure in sealed section 404 prior to engaging the pad 302 will initiate fluid flow from the formation into the sealed section 404. With formation flowing when the extendable element 302 engages the wall, the port 420 extending through the pad 320 will be exposed to pristine fluid 408. Control of the orientation of the extendable element 302 is highly desirable when drilling deviated or horizontal wells. The preferred orientation is toward an upper portion of the borehole wall. A sensor 214, such as an accelerometer, can be used to sense the orientation of the extendable element 302. The extendable element can then be oriented to the desired direction using methods and not-shown components well known in the art such as directional drilling with a bend-sub. For example, the drilling apparatus may include a drill string 206 rotated by a surface rotary drive (not shown). A downhole mud motor (see FIG. 1 at 210) may be used to independently rotate the drill bit. The drill string can thus be rotated until the extendable element is oriented to the desired direction as indicated by the sensor 214. The surface rotary drive is halted to stop rotation of the drill string 206 during a test, while rotation of the drill bit may be continued using the mud motor of desired.

A downhole controller 418 preferably controls the test. The controller 418 is connected to at least one system volume control device (pump) 426. The pump 426 is a preferably small piston driven by a ball screw and stepper motor or other variable control motor, because of the ability to iteratively change the volume of the system. The pump 426 may also be a progressive cavity pump. When using other types of pumps, a flow meter should also be included. A valve 430 for controlling fluid flow to the pump 426 is disposed in the fluid line 422 between a pressure sensor 424 and the pump 426. A test volume 405 is the volume below the retracting piston of the pump 426 and includes the fluid line 422. The pressure sensor is used to sense the pressure within the test volume 404. The sensor 424 is connected to the controller 418 to provide the feedback data required for a closed loop control system. The feedback is used to adjust parameter settings such as a pressure limit for subsequent volume changes. The downhole controller may incorporate a processor (not separately shown) for further reducing test time, and an optional database and storage system may be incorporated to save data for further analysis and for providing default settings.

When drawing down the sealed section 404, fluid is vented to the upper annulus 402 via an equalization valve 419. A conduit 427 connecting the pump 426 to the equalization valve 419 includes a selectable internal valve 432. If fluid sampling is desired, the fluid may be diverted to optional sample reservoirs 428 by using the internal valves 432, 433$a$, and 433$b$ rather than venting through the equalization valve 419. For typical fluid sampling, the fluid contained in the reservoirs 428 is retrieved from the well for analysis.

One embodiment for testing low mobility (tight) formations includes at least one pump (not separately shown) in addition to the pump 426 shown. The second pump should have an internal volume much less than the internal volume of the primary pump 426. A suggested volume of the second pump is 1/100 the volume of the primary pump. A typical "T" connector having selection valve controlled by the downhole controller 418 may be used to connect the two pumps to the fluid line 422.

In a tight formation, the primary pump is used for the initial draw down. The controller switches to the second pump for operations below the formation pressure. An advantage of the second pump with a small internal volume is that build-up times are faster than with a pump having a larger volume.

Results of data processed downhole may be sent to the surface in order to provide downhole conditions to a drilling operator or to validate test results. The controller passes processed data to a two-way data communication system 416 disposed downhole. The downhole system 416 transmits a data signal to a surface controller 412 that contains a processor and memory storage. There are several methods and apparatuses known in the art suitable for transmitting data. Any suitable system would suffice for the purposes of this invention. Once the signal is received at the surface, a surface controller 412 and processor 410 converts and transfers the data to a suitable output or storage device 414. As described earlier, surface controller 412 is also used to send the test initiation command.

Figure 4:
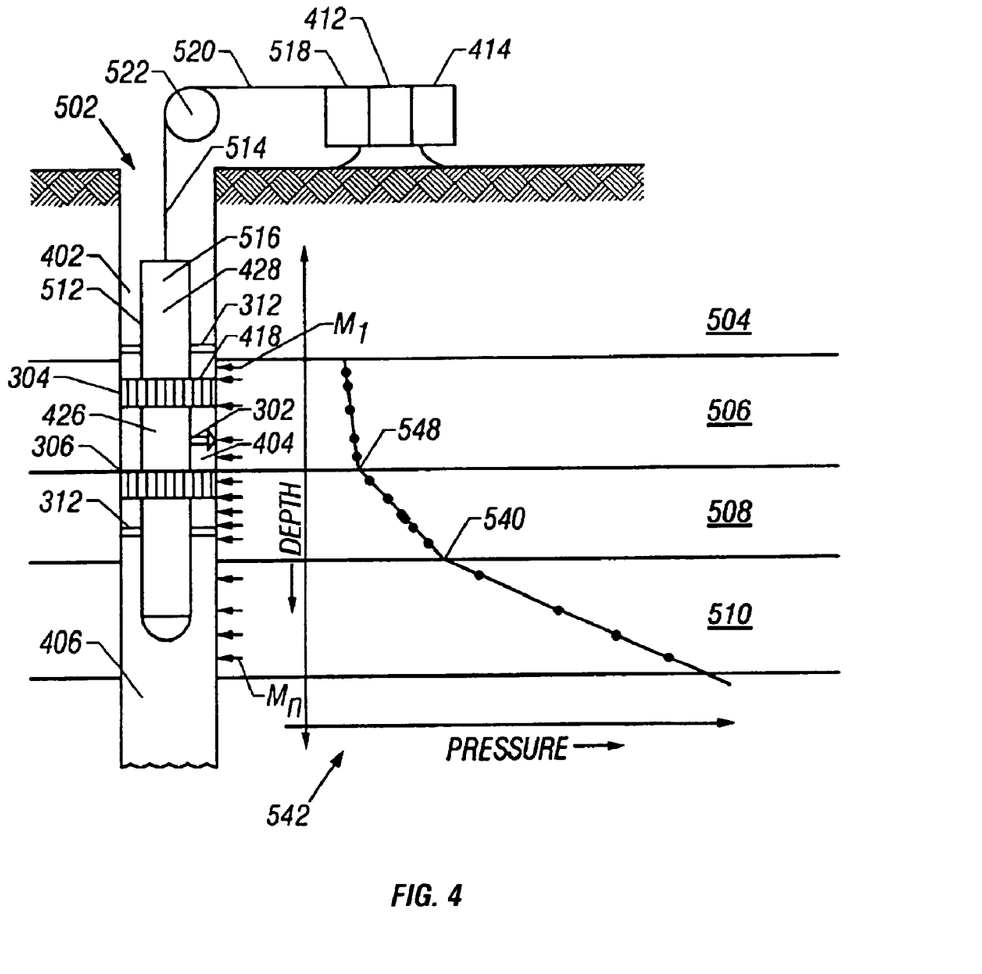
FIG. 4 is an elevation view of a wireline embodiment according to the present invention.

FIG. 4 is a wireline embodiment according to the present invention. A well 502 is shown traversing a formation 504 containing a reservoir having gas 506, oil 508 and water 510 layers. A wireline tool 512 supported by an armored cable 514 is disposed in the well 502 adjacent the formation 504. Extending from the tool 512 are optional grippers 312 for stabilizing the tool 512. Two expandable packers 304 and 306 are disposed on the tool 512 are capable of separating the annulus of the borehole 502 into an upper annulus 402, a sealed intermediate annulus 404 and a lower annulus 406. A selectively extendable pad member 302 is disposed on the tool 512. The grippers 312, packers 304 and 306, and extendable pad element 302 are essentially the same as those described in FIGS. 2 and 3, therefore the detailed descriptions are not repeated here.

Telemetry for the wireline embodiment is a downhole two-way communication unit 516 connected to a surface two-way communication unit 518 by one or more conductors 520 within the armored cable 514. The surface communication unit 518 is housed within a surface controller 412 that includes a processor, memory, and output device 414 as described in FIG. 3. A typical cable sheave 522 is used to guide the armored cable 514 into the borehole 502. The tool 512 includes a downhole controller 418 having a processor and memory for controlling formation tests in accordance with methods to be described in detail later.

The embodiment shown in FIG. 4 is desirable for determining contact points 538 and 540 between the gas 506 and oil 508 and between the oil 508 and water 510. To illustrate this application a plot 542 of pressure versus depth is shown superimposed on the formation 504. The downhole tool 512 includes a pump 426, a plurality of sensors 424 and optional sample tanks 428 as described above for the embodiment shown in FIG. 3. These components are used to measure formation pressure at varying depths within the borehole 502. The pressures plotted as shown are indicative of fluid or gas density, which varies distinctly from one fluid to the next. Therefore, having multiple pressure measurements $M_1$–$M_n$ provides data necessary to determine the contact points 538 and 540.

As described previously, when interpreting electric well logs in regions having brine formation fluids, it is important to know the formation brine resistivity. In one embodiment, the present invention relates the formation fluid density, determined from the formation fluid pressure gradient, to the formation fluid salinity. The formation fluid resistivity is then determined using published data relating fluid salinity to resistivity. This process is described in the flow chart of FIG. 5. In step 600, a formation test tool, such as one of the exemplary tools described previously, is traversed along the borehole and stopped at predetermined locations of interest along the borehole. At each predetermined location, the tool is used to determine the formation fluid pressure and the formation fluid temperature 610. Such data may be transmitted to surface processor 412 and/or downhole processor 418 for analysis. The pressure gradient is determined from the pressure and temperature data 620.

Figure 5:
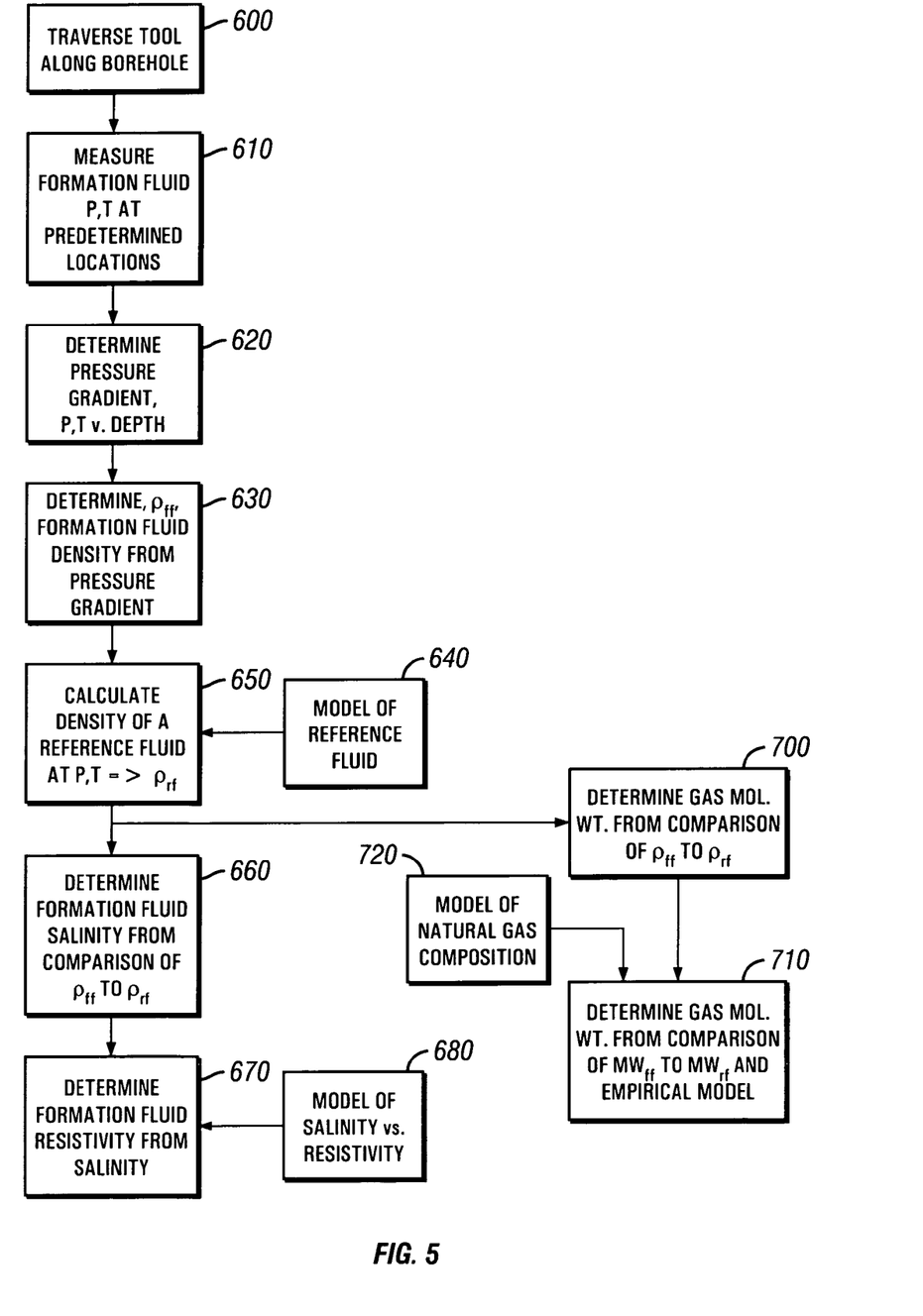
FIG. 5 is a flow chart describing the process of determining a formation fluid parameter according to embodiments of the present invention.

The gradient may be determined directly from the pressures measured at two predetermined locations divided by the vertical distance between the predetermined locations. The vertical distance between the predetermined locations can be determined from direct measurement in vertical holes and from directional survey data in inclined holes. The formation fluid density is determined from the pressure gradient 630 using techniques known in the art. Certain parameters of interest of the formation can be determined by comparing the formation fluid density to the density of a reference fluid at the downhole conditions 650. In the case where the formation fluid is a brine solution, the formation fluid density may be measurably different from that of pure water at the downhole pressure and temperature. By comparing the formation brine density to a calculated density of pure water at the downhole conditions, the present invention determines the salinity of the formation fluid 660. The density of pure water at downhole pressure and temperature is determined from empirical models of water 640. For example, for pressures less than 100 MPa (14,500 psi) and temperatures to 325 C, correlations are available such as the IAPWS-97 model of the International Association for the Properties of Water and Steam available from the National Institute of Standards and Technology(NIST) of Gaithersburg, Md. Alternatively, a correlation covering the range of 25 C to 250 C and atmospheric to 206 MPA (30,000 psi) is calculated using the data for the density of water at varying pressure and temperature gathered from the NIST database (see Table 1). The data are correlated for the density of pure water as a function of pressure and temperature using a commercial statistical package, such as the STATISTICA™ brand of statistical software marketed by StatSoft®, Inc. of Tulsa, Okla. The resulting equation is based on 336 data points, has an $R^2=0.99986$, a standard error of 0.00073 g/ml, and is given by:

$$\rho_{water}(g/ml) = 1.00806 - 2.27533 \times 10^{-6} *T^2 + 2.7666583 \times 10^{-3} *P + 5.906096 \times 10^{-8} *PT^2 - 2.706382 \times 10^{-4} *T - 2.81544 \times 10^{-7} *P^2 T - 50.79548 *T^3 + 4.764802 \times 10^{-7} *P^3 - 1.220952 \times 10^{-5} *P^2 \quad (1)$$

where T is the measured formation temperature in ° C., and P is the measured formation pressure in kpsi (1 kpsi=6.89 kPa). It is commonly known that the dissolved solids in brine solution are predominately NaCl having a published density of 2.165 to 2.2 g/ml with an average density of about 2.17 g/ml. By comparing the measured density of the brine solution $\rho_{brine}$ to the density of pure water at the downhole conditions, the salinity of the brine solution can be determined from the following:

Let the fraction by weight of salt=$f_{ws}$, and the fraction by volume of salt=$f_{vs}$, then $$f_{vs} = (\rho_{brine} - \rho_{water})/(\rho_{salt} - \rho_{water}) \quad (2)$$

and, $f_{ws}$ can be determined from $f_{vs}$ using $$f_{ws} = 1/[(((1/f_{vs}) - 1)/(\rho_{salt}/\rho_{water})) + 1] \quad (3)$$

where $f_{ws}$ is also called the salinity, S, and is often expressed as parts per million (ppm).

Using correlations known in the art, a salinity is related to resistivity 680. For example, the salinity is compared to published charts of salinity versus resistivity. Such charts include "Log Interpretation Charts/Dresser Atlas", Houston, Tex., Dresser Atlas Division of Dresser Industries, 1979 (now Baker Atlas, Division of Baker Hughes Incorporated). Also see "Log Interpretation Charts", Houston, Tex., Schlumberger Inc., 1972 and 1979. Alternatively, such chart correlations, or their underlying data, may be converted to a multi-variable correlation model of brine resistivity as a function of brine salinity, downhole pressure, and downhole temperature, using techniques known in the art. One such exemplary model, published by Baker Atlas in the Log Interpretation Charts described above, is of the form:

$$R_{brineT} = \{0.0123 + [3647.5/(S)^{0.955}]\} * [45.4/(T+21.5)] \quad (4)$$

where $R_{brineT}$ is the resistivity in ohm-meter at the measured downhole temperature, T in ° C., and S is the salinity (NaCl concentration in ppm) determined from Eq. 3.

Such a model may be stored in surface processor 412 and/or downhole processor 518 for analysis of the formation pressure and temperature measurements, in situ. Therefore, the present embodiment provides resistivity of the formation fluid from measurements of the formation fluid pressure and formation fluid temperature at predetermined locations along the borehole 670.

In another embodiment, still referring to FIG. 5, formation fluid pressure and formation fluid temperature may be used to determine the composition of natural gas and the gas dryness in the formation. Steps 600–650 are performed as described above. Here, however, the model of the reference fluid in step 640 is a model of the properties of pure methane at downhole conditions. Gas dryness is commonly defined in the art as the ratio of the molar concentration of methane molecules ($C_1$) to the molar concentration of heavier hydrocarbon molecules such as ethane, propane, butane and pentane, etc. (collectively referred to herein as $C_{2+}$). One may determine the density of formation gas using the measurements of formation pressure 630. According to Gas Research Institute Report #82/0037, on average, out of 100 molecules of natural gas, 93 are methane, 3 are ethane, 1 is propane, 0.5 is butane, with smaller numbers for higher molecular weight molecules. There are about thirteen times as many methane molecules as non-methane molecules. Thus, the methane-methane molecular forces and molecular size are substantially dominant in determining the density of molecules per unit volume in a natural gas mixture. Thus, the number of molecules per unit volume of pure methane may be estimated to be substantially the same as the number of molecules of all molecular types in a 90 mole percent mixture of methane with a few heavier hydrocarbon gases, as commonly occurs with natural gas. The density of pure methane at measured downhole conditions is determined using an empirical correlation of available data shown in Table 2. The data were correlated using the Statistica™ brand statistical package described previously to provide methane density as a function of downhole formation pressure and formation temperature. The correlation for determining methane density is based on 234 data points, has an $R^2=0.99914$, a standard error of 0.00392 g/ml, and is given by:

$$\rho_{methane}(g/ml) = 2.770625 \times 10^{-3} + 2.480415 \times 10^{-5} *P - 1.120014 \times 10^{-9} *P^2 + 1.808398 \times 10^{-14} *P^3 - 1.307547 \times 10^{-7} *T + 1.455411 \times 10^{-3} *(P/T) - 4.922499 \times 10^{-6} *(P/T)^2 + 5.933963 \times 10^{-9} *(P/T)^3 \quad (5)$$

where T is the measured formation temperature in ° C., and P is the measured formation pressure in kpsi (1 kpsi=6.89 kPa). Then the calculated density of the pure methane at downhole conditions may be divided by methane's mass per mole (16.04 g/mole) to estimate the number of moles of gas per ml at downhole conditions. Dividing the measured density of the formation gas by the number of moles per ml, the average molecular weight of the formation gas is determined 700. The greater the deviation of the average molecular weight of the formation gas from the molecular weight of pure methane (16.04), the "wetter" the gas is considered to be. Conversely, the closer the average molecular weight of the formation gas is to the molecular weight of pure methane, the "drier" the gas is considered to be.

Having determined the average molecular weight of the formation gas, it is desirable to determine the breakdown of the constituents. For a particular region of the world, the ratios of the heavier molecules, $C_2+$ along with $N_2$ and $CO_2$, are often known and available in databases of prior reservoir analyses in that region 720. The ratio of $C_1$(methane) to the overall mixture is, however, more variable because methane is created by multiple processes, including biological and geological processes. The following analysis provides a method for estimating the molecular breakdown, also called composition, of the formation gas knowing the average molecular weight determined from the formation pressure gradient described previously. The average molecular weight of a natural gas is the molar fraction, $f_i$, of the i-th pure gas component times the molecular weight of that component. For example, assuming that the gas components of interest are the C1–C6 hydrocarbons, nitrogen and carbon dioxide, then $$MW_{avg} = f_{C1}*MW_{C1} + f_{C2}*MW_{C2} + f_{C3}*MW_{C3} + f_{C4}*MW_{C4} + f_{C5}*MW_{C5} + f_{C6}*MW_{C6} + f_{N2}*MW_{N2} + f_{CO2}*MW_{CO2} \quad (6)$$

then, assuming these are the only gases in significant amounts, the sum of their molar fractions is unity.

$$1 = f_{C1} + f_{C2} + f_{C3} + f_{C4} + f_{C5} + f_{C6} + f_{N2} + f_{CO2} = \Sigma f_i \quad (7)$$

The ratio of $C_1$ to the other gases is quite variable, but the ratio of $C_2$ to the other gases is less variable such that the molar ratio of the i-th gas to $C_2$ is defined as $r_{i2} = f_i/f_{C2}$. Then, $$1 = f_{C1} + f_{C2}(1 + r_{32} + r_{42} + r_{52} + r_{62} + r_{N2C2} + r_{CO2C2}) \quad (8a)$$

$$1 = f_{C1} + f_{C2}(1 + \Sigma_i r_i) \quad (8b)$$

Remembering that, for a particular region of the world, the ratios of the concentrations of heavier molecules $C_2+$ to each other and to the concentrations of $N_2$ and $CO_2$ are often known, then $$(MW_{avg} - f_{C1}*MW_{C1}) = f_{C2}*D = f_{C2}*[MW_{C2} + r_{32}*MW_{C3} + r_{42}*MW_{C4} + r_{52}*MW_{C5} + r_{62}*MW_{C6} + r_{N2C2}*MW_{N2} + r_{CO2C2}*MW_{CO2}] \quad (9)$$

$$(MW_{avg} - fC1*MW_{C1}) = (1-fC1)*D/(1+\Sigma_i r_i) \quad (10)$$

$$f_{C1} = [MW_{avg} - D/(1+\Sigma_i r_i)] / [MW_{C1} - D/(1+\Sigma_i r_i)] \quad (11)$$

Noting that, $D/(1+\Sigma_i r_i) = MW_{avg-C1}$ is the average molecular weight of all of the non-methane gases in the natural gas mixture, (the average when excluding $C_1$), and $$f_{C1} = [MW_{avg} - MW_{avg-C1}] / [MW_{C1} - MW_{avg-C1}] \quad (12)$$

where $MW_{avg}$ is measured from downhole formation pressure measurements; $MW_{C1}$ is the molecular weight of pure methane (16.04); and $MW_{avg-C1}$ is determined from database information related to the ratios of the non-methane gases catalogued for various regions in commercially available databases. With $f_{C1}$ determined, the constituent makeup of the formation gas can then be established 710.

The present invention has been described as a method and apparatus operating in a downhole environment. However, the present invention may also be embodied as a set of instructions on a computer readable medium comprising ROM, RAM, CD ROM, DVD, FLASH or any other computer readable medium, now known or unknown, that when executed causes a computer such as, for example, a processor in downhole controller 418 and/or a processor in surface controller 412, to implement the method of the present invention.

The foregoing description is directed to particular embodiments of the present invention for the purpose of illustration and explanation. It will be apparent, however, to one skilled in the art that many modifications and changes to the embodiment set forth above are possible. It is intended that the following claims be interpreted to embrace all such modifications and changes.

TABLE 1

Density of Water (g/ml) vs. Pressure (psi) and Temperature (C.) (NIST data)

| P [psi] | 25 | 50 | 75 | 100 | 125 | 150 | 175 | 200 | 225 | 250 |
|---|---|---|---|---|---|---|---|---|---|---|
| 14.7 | 0.99705 | 0.98804 | 0.97484 | 0.95835 | | | | | | |
| 29.4 | 0.99709 | 0.98808 | 0.97489 | 0.95840 | | | | | | |
| 33.7 | | | | | 0.93902 | | | | | |
| 44.1 | 0.99714 | 0.98812 | 0.97493 | 0.95844 | 0.93906 | | | | | |
| 58.8 | 0.99718 | 0.98817 | 0.97498 | 0.95849 | 0.93911 | | | | | |
| 69.1 | | | | | | 0.91701 | | | | |
| 73.5 | 0.99723 | 0.98821 | 0.97502 | 0.95854 | 0.93916 | 0.91703 | | | | |
| 88.2 | 0.99728 | 0.98826 | 0.97507 | 0.95859 | 0.93922 | 0.91708 | | | | |
| 100.0 | 0.99731 | 0.98829 | 0.97510 | 0.95863 | 0.93926 | 0.91713 | | | | |
| 129.5 | | | | | | | 0.89228 | | | |
| 200.0 | 0.99762 | 0.98859 | 0.97541 | 0.95895 | 0.93961 | 0.91752 | 0.89260 | | | |
| 225.5 | | | | | | | | 0.86466 | | |
| 300.0 | 0.99793 | 0.98889 | 0.97572 | 0.95927 | 0.93996 | 0.91791 | 0.89304 | 0.86505 | | |
| 369.8 | | | | | | | | | 0.83375 | |
| 400.0 | 0.99824 | 0.98919 | 0.97602 | 0.95959 | 0.94031 | 0.91830 | 0.89349 | 0.86557 | 0.83394 | |
| 500.0 | 0.99855 | 0.98949 | 0.97632 | 0.95991 | 0.94066 | 0.91869 | 0.89393 | 0.86609 | 0.83458 | |
| 576.7 | | | | | | | | | | 0.79889 |
| 600.0 | 0.99886 | 0.98979 | 0.97663 | 0.96023 | 0.94100 | 0.91907 | 0.89437 | 0.86661 | 0.83521 | 0.79908 |
| 700.0 | 0.99917 | 0.99009 | 0.97693 | 0.96055 | 0.94135 | 0.91946 | 0.89481 | 0.86713 | 0.83584 | 0.79988 |
| 800.0 | 0.99948 | 0.99038 | 0.97723 | 0.96087 | 0.94170 | 0.91985 | 0.89525 | 0.86764 | 0.83646 | 0.80068 |
| 900.0 | 0.99978 | 0.99068 | 0.97754 | 0.96119 | 0.94204 | 0.92023 | 0.89569 | 0.86816 | 0.83708 | 0.80147 |
| 1000.0 | 0.99700 | 0.99098 | 0.97784 | 0.96151 | 0.94239 | 0.92061 | 0.89613 | 0.86867 | 0.83770 | 0.80225 |
| 2000.0 | 1.00010 | 0.99392 | 0.98083 | 0.96466 | 0.94579 | 0.92438 | 0.90040 | 0.87365 | 0.84369 | 0.80976 |
| 3000.0 | 1.00310 | 0.99682 | 0.98377 | 0.96774 | 0.94912 | 0.92805 | 0.90454 | 0.87843 | 0.84937 | 0.81676 |
| 4000.0 | 1.00610 | 0.99967 | 0.98666 | 0.97077 | 0.95237 | 0.93163 | 0.90856 | 0.88304 | 0.85479 | 0.82334 |
| 5000.0 | 1.00910 | 1.00250 | 0.98951 | 0.97375 | 0.95556 | 0.93512 | 0.91246 | 0.88748 | 0.85997 | 0.82954 |
| 6000.0 | 1.01200 | 1.00530 | 0.99231 | 0.97668 | 0.95869 | 0.93853 | 0.91625 | 0.89178 | 0.86495 | 0.83543 |

TABLE 1-continued

Density of Water (g/ml) vs. Pressure (psi) and Temperature (C.) (NIST data)

| P [psi] | 25 | 50 | 75 | 100 | T [C.] 125 | 150 | 175 | 200 | 225 | 250 |
|---|---|---|---|---|---|---|---|---|---|---|
| 7000.0 | 1.01490 | 1.00800 | 0.99508 | 0.97955 | 0.96176 | 0.94187 | 0.91994 | 0.89594 | 0.86973 | 0.84104 |
| 8000.0 | 1.01770 | 1.01070 | 0.99780 | 0.98238 | 0.96477 | 0.94513 | 0.92354 | 0.89998 | 0.87433 | 0.84640 |
| 9000.0 | 1.02050 | 1.01340 | 1.00050 | 0.98517 | 0.96772 | 0.94833 | 0.92705 | 0.90390 | 0.87878 | 0.85153 |
| 10000.0 | 1.02330 | 1.01600 | 1.00310 | 0.98791 | 0.97063 | 0.95146 | 0.93048 | 0.90771 | 0.88309 | 0.85647 |
| 11000.0 | 1.02600 | 1.01860 | 1.00570 | 0.99061 | 0.97348 | 0.95453 | 0.93384 | 0.91143 | 0.88726 | 0.86122 |
| 12000.0 | 1.02870 | 1.02120 | 1.00830 | 0.99327 | 0.97629 | 0.95754 | 0.93712 | 0.91505 | 0.89131 | 0.86581 |
| 13000.0 | 1.03140 | 1.02370 | 1.01090 | 0.99589 | 0.97905 | 0.96050 | 0.94033 | 0.91858 | 0.89524 | 0.87025 |
| 14000.0 | 1.03400 | 1.02620 | 1.01340 | 0.99847 | 0.98177 | 0.96340 | 0.94347 | 0.92203 | 0.89907 | 0.87454 |
| 15000.0 | 1.03660 | 1.02860 | 1.01580 | 1.00100 | 0.98444 | 0.96626 | 0.94656 | 0.92540 | 0.90280 | 0.87871 |
| 16000.0 | 1.03910 | 1.03110 | 1.01830 | 1.00350 | 0.98708 | 0.96906 | 0.94959 | 0.92870 | 0.90643 | 0.88276 |
| 17000.0 | 1.04170 | 1.03350 | 1.02070 | 1.00600 | 0.98968 | 0.97182 | 0.95255 | 0.93193 | 0.90998 | 0.88669 |
| 18000.0 | 1.04420 | 1.03590 | 1.02310 | 1.00850 | 0.99224 | 0.97454 | 0.95547 | 0.93510 | 0.91345 | 0.89053 |
| 19000.0 | 1.04660 | 1.03820 | 1.02540 | 1.01090 | 0.99476 | 0.97721 | 0.95834 | 0.93820 | 0.91684 | 0.89426 |
| 20000.0 | 1.04910 | 1.04060 | 1.02780 | 1.01330 | 0.99725 | 0.97985 | 0.96115 | 0.94124 | 0.92015 | 0.89790 |
| 22000.0 | 1.05620 | 1.04510 | 1.03230 | 1.01800 | 1.00210 | 0.98500 | 0.96665 | 0.94716 | 0.92658 | 0.90493 |
| 24000.0 | 1.06080 | 1.04960 | 1.03680 | 1.02250 | 1.00690 | 0.99000 | 0.97197 | 0.95287 | 0.93276 | 0.91166 |
| 26000.0 | 1.06530 | 1.05400 | 1.04120 | 1.02700 | 1.01150 | 0.99487 | 0.97714 | 0.95840 | 0.93871 | 0.91811 |
| 28000.0 | 1.06970 | 1.05830 | 1.04550 | 1.03140 | 1.01610 | 0.99962 | 0.98216 | 0.96375 | 0.94445 | 0.92431 |
| 30000.0 | 1.07400 | 1.06250 | 1.04970 | 1.03560 | 1.02050 | 1.00420 | 0.98704 | 0.96894 | 0.95001 | 0.93029 |

TABLE 2

Density of Methane (g/ml) vs. Pressure (psi) and Temperature (C.)

| P (psi) | 75 | 100 | T (C.) 125 | 150 | 175 | 200 |
|---|---|---|---|---|---|---|
| | | | Density (g/cc) | | | |
| 100 | 0.0038457 | 0.0035816 | 0.0033522 | 0.0031508 | 0.0029725 | 0.0028136 |
| 200 | 0.0077397 | 0.0071954 | 0.0067252 | 0.0063145 | 0.0059524 | 0.0056305 |
| 300 | 0.0116810 | 0.0108400 | 0.0101180 | 0.0094090 | 0.0089386 | 0.0084498 |
| 400 | 0.0156680 | 0.0145140 | 0.0135290 | 0.0126760 | 0.0119300 | 0.0112710 |
| 500 | 0.0196990 | 0.0182150 | 0.0169560 | 0.0158720 | 0.0149260 | 0.0140920 |
| 600 | 0.0237720 | 0.0219420 | 0.0203990 | 0.0190750 | 0.0179250 | 0.0169140 |
| 700 | 0.0278850 | 0.0256930 | 0.0238550 | 0.0222850 | 0.0209260 | 0.0197340 |
| 800 | 0.0320360 | 0.0294650 | 0.0273230 | 0.0255010 | 0.0239280 | 0.0225520 |
| 900 | 0.0362200 | 0.0332570 | 0.0308000 | 0.0287200 | 0.0269290 | 0.0253680 |
| 1000 | 0.0404360 | 0.0370650 | 0.0342850 | 0.0319410 | 0.0299290 | 0.0281790 |
| 2000 | 0.0833620 | 0.0751400 | 0.0691010 | 0.0639300 | 0.0595930 | 0.0558850 |
| 3000 | 0.1242300 | 0.1120100 | 0.1023300 | 0.0944430 | 0.0878610 | 0.0822670 |
| 4000 | 0.1593700 | 0.1444300 | 0.1323200 | 0.1223000 | 0.1138900 | 0.1067000 |
| 5000 | 0.1880600 | 0.1719200 | 0.1584100 | 0.1470100 | 0.1372800 | 0.1288900 |
| 6000 | 0.2113500 | 0.1949300 | 0.1808000 | 0.1686100 | 0.1580500 | 0.1488200 |
| 7000 | 0.2305400 | 0.2142900 | 0.2000100 | 0.1874600 | 0.1764100 | 0.1666500 |
| 8000 | 0.2466700 | 0.2308000 | 0.2166100 | 0.2039600 | 0.1926800 | 0.1826000 |
| 9000 | 0.2605100 | 0.2450800 | 0.2311200 | 0.2185300 | 0.2071700 | 0.1969200 |
| 10000 | 0.2725800 | 0.2576200 | 0.2439400 | 0.2314900 | 0.2201600 | 0.2098500 |
| 11000 | 0.2832800 | 0.2687500 | 0.2553900 | 0.2431200 | 0.2318800 | 0.2215800 |
| 12000 | 0.2928700 | 0.2787600 | 0.2657000 | 0.2536400 | 0.2425300 | 0.2322900 |
| 13000 | 0.3015600 | 0.2878400 | 0.2750800 | 0.2632400 | 0.2522700 | 0.2421200 |
| 14000 | 0.3095100 | 0.2961400 | 0.2836700 | 0.2720500 | 0.2616400 | 0.2511900 |
| 15000 | 0.3168300 | 0.3037900 | 0.2915900 | 0.2801800 | 0.2695300 | 0.2596000 |
| 16000 | 0.3236100 | 0.3108900 | 0.2989400 | 0.2877300 | 0.2772500 | 0.2674300 |
| 17000 | 0.3299400 | 0.3174900 | 0.3057800 | 0.2947800 | 0.2844500 | 0.2747600 |
| 18000 | 0.3358700 | 0.3236800 | 0.3122000 | 0.3013800 | 0.2912100 | 0.2816900 |
| 19000 | 0.3414400 | 0.3295000 | 0.3182300 | 0.3075900 | 0.2975700 | 0.2881200 |
| 20000 | 0.3467100 | 0.3350000 | 0.3239200 | 0.3134600 | 0.3035800 | 0.2942400 |
| 21000 | 0.3517000 | 0.3402000 | 0.3293100 | 0.3190100 | 0.3092700 | 0.3000500 |
| 22000 | 0.3564500 | 0.3451500 | 0.3344400 | 0.3242900 | 0.3146800 | 0.3055700 |
| 23000 | 0.3609700 | 0.3498600 | 0.3393100 | 0.3293100 | 0.3198300 | 0.3108300 |
| 24000 | 0.3652900 | 0.3543500 | 0.3439700 | 0.3341000 | 0.3247400 | 0.3158500 |
| 25000 | 0.3694300 | 0.3586600 | 0.3484200 | 0.3386900 | 0.3294500 | 0.3206600 |
| 26000 | 0.3734000 | 0.3627900 | 0.3526900 | 0.3430900 | 0.3339500 | 0.3252600 |
| 27000 | 0.3772200 | 0.3667500 | 0.3567900 | 0.3473100 | 0.3382800 | 0.3296900 |
| 28000 | 0.3808900 | 0.3705700 | 0.3607400 | 0.3513700 | 0.3424500 | 0.3339500 |
| 29000 | 0.3844400 | 0.3742500 | 0.3645400 | 0.3552900 | 0.3464600 | 0.3380500 |
| 30000 | 0.3878700 | 0.3778100 | 0.3682100 | 0.3590600 | 0.3503300 | 0.3420000 |

What is claimed is:

1. A method for determining a parameter of interest of a formation fluid, comprising:
   a. inserting a tool into a borehole in a formation;
   b. using the tool to measure a formation fluid pressure and a formation fluid temperature at a plurality of locations along the borehole and calculating a formation fluid density along the borehole therefrom;
   c. determining a density of a reference fluid related to the formation fluid pressure and the formation fluid temperature at the plurality of locations; and
   d. determining the parameter of interest of the formation fluid at the plurality of locations from a comparison of the corresponding formation fluid density and the reference fluid density at the plurality of locations.

2. The method of claim 1, wherein the formation fluid is chosen from the group consisting of: a brine; and a natural gas.

3. The method of claim 1, wherein the parameter of interest is chosen from the group consisting of: a formation fluid resistivity; and a formation fluid molecular composition.

4. The method of claim 1, wherein the reference fluid is chosen from the group consisting of: a substantially pure water; and a substantially pure methane.

5. The method of claim 1, wherein the formation fluid is a brine and the reference fluid is a substantially pure water, and determining a formation fluid parameter of interest comprises:
   i. comparing the formation fluid density to the reference fluid density to determine a salinity of the formation fluid; and
   ii. using a first empirical model to determine a formation fluid resistivity from the formation fluid salinity.

6. The method of claim 1, wherein the formation fluid is a natural gas and the reference fluid is a substantially pure methane, and determining a formation fluid parameter of interest comprises:
   i. comparing the formation fluid density to the reference fluid density to determine a molecular weight of the formation fluid; and
   ii. using a second empirical model to determine a formation fluid molecular composition from the formation fluid molecular weight.

7. The method of claim 1, wherein the tool withdraws a sample from the formation.

8. The method of claim 1, wherein the tool comprises a controller having a processor and a memory, the processor adapted to operate under programmed instructions to determine the parameter of interest of the formation fluid from a comparison of the corresponding formation fluid density and the reference fluid density.

9. A system for determining a formation fluid parameter of interest, comprising:
   a. a tool in a borehole, the tool adapted to determine a formation fluid pressure and a formation fluid temperature along the borehole;
   b. a controller acting under programmed instructions to determine a formation fluid density along the borehole from the formation fluid pressure and having; (i) a model of a reference fluid stored therein for determining a reference fluid density; and (ii) an empirical correlation stored in the controller, the empirical correlation relating the formation parameter of interest to a comparison of the formation fluid density to the reference fluid density.

10. The system of claim 9, wherein the formation fluid is chosen from the group consisting of: a brine; and a natural gas.

11. The system of claim 9, wherein the parameter of interest is chosen from the group consisting of: a formation fluid resistivity; and a formation fluid molecular composition.

12. The system of claim 9, wherein the reference fluid is chosen from the group consisting of: a substantially pure water; and a substantially pure methane.

13. The system of claim 9, wherein the formation fluid is a brine and the reference fluid is a substantially pure water, and the empirical correlation comprises a first empirical correlation and relates the comparison of the formation fluid density and the reference fluid density to a formation fluid salinity.

14. The system of claim 13, wherein the empirical correlation comprises a second empirical correlation and relates the formation fluid salinity to a formation fluid resistivity.

15. The system of claim 9, wherein the formation fluid is a natural gas and the reference fluid is a substantially pure methane, and the empirical correlation comprises a first empirical correlation and relates the comparison of the formation fluid density and the reference fluid density to a molecular weight of the formation fluid.

16. The system of claim 15, wherein the empirical correlation comprises a second empirical correlation and relates the formation fluid molecular weight to the formation fluid molecular composition.

17. The system of claim 9, wherein the tool withdraws a sample from the formation.

18. The system of claim 9, wherein the tool comprises a controller having a processor and a memory, the processor adapted to operate under stored instructions to determine the parameter of interest of the formation fluid from a comparison of the formation fluid density and the reference fluid density.

19. A computer readable medium containing a set of executable instructions that when executed by a computer perform a method for determining a parameter of interest of a formation fluid, comprising:
   a. determining a density of a reference fluid along the borehole related to the formation fluid pressure and the formation fluid temperature; and
   b. determining the parameter of interest of the formation fluid at a plurality of locations from a comparison of the formation fluid density and the reference fluid density.

20. The method of claim 19, wherein the formation fluid is chosen from the group consisting of: a brine; and a natural gas.

21. The method of claim 19, wherein the parameter of interest is chosen from the group consisting: a formation fluid resistivity; and a formation fluid molecular composition.

22. The method of claim 19, wherein the reference fluid is chosen from the group consisting of: a substantially pure water; and a substantially pure methane.

23. The method of claim 19, wherein the formation fluid is a brine and the reference fluid is a substantially pure water, and determining a formation fluid parameter of interest comprises:
   i. comparing the formation fluid density to the reference fluid density to determine a salinity of the formation fluid; and
   ii. using a first empirical model to estimate a formation fluid resistivity from the formation fluid salinity.

24. The method of claim 19, wherein the formation fluid is a natural gas and the reference fluid is a substantially pure methane, and determining a formation fluid parameter of interest comprises:
   i. comparing the formation fluid density to the reference fluid density to determine the molecular weight of the formation fluid; and
   ii. using a second empirical model to estimate a formation fluid molecular composition from the formation fluid molecular weight.

25. The method of claim 19, wherein the tool withdraws a sample from the formation.

* * * * *